United States Patent
Young et al.

(10) Patent No.: US 11,447,088 B2
(45) Date of Patent: Sep. 20, 2022

(54) ROOF AIRBAG MODULE

(71) Applicant: Joyson Safety Systems Acquisition LLC, Auburn Hills, MI (US)

(72) Inventors: Jeffrey Young, Bruce Township, MI (US); Kurt Kastelic, Rochester, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 0 days.

(21) Appl. No.: 17/213,038

(22) Filed: Mar. 25, 2021

(65) Prior Publication Data

US 2021/0300286 A1    Sep. 30, 2021

Related U.S. Application Data

(60) Provisional application No. 62/994,753, filed on Mar. 25, 2020.

(51) Int. Cl.
| | |
|---|---|
| *B60R 21/214* | (2011.01) |
| *B60R 21/213* | (2011.01) |
| *B60R 21/013* | (2006.01) |

(52) U.S. Cl.
CPC .......... *B60R 21/213* (2013.01); *B60R 21/013* (2013.01); *B60R 21/214* (2013.01)

(58) Field of Classification Search
CPC .................................................... B60R 21/213
See application file for complete search history.

(56) References Cited

U.S. PATENT DOCUMENTS

| | | | | |
|---|---|---|---|---|
| 4,298,214 | A * | 11/1981 | Brown, Jr. ............ | B60R 21/213 280/741 |
| 6,520,572 | B1 * | 2/2003 | Niederman ............ | B60R 21/08 180/281 |
| 10,427,637 | B2 * | 10/2019 | Raikar ........................ | B60J 7/02 |
| 10,471,924 | B2 * | 11/2019 | Min ...................... | B60R 21/214 |
| 10,556,564 | B2 * | 2/2020 | Lee ...................... | B60R 21/231 |
| 10,625,705 | B2 * | 4/2020 | Min ...................... | B60R 21/214 |
| 10,639,973 | B2 * | 5/2020 | Sommer ................. | B60R 21/06 |
| 10,744,971 | B2 * | 8/2020 | Hwangbo ........... | B60R 21/2338 |
| 10,836,345 | B2 * | 11/2020 | Koo .................... | B60R 21/2334 |
| 10,974,679 | B2 * | 4/2021 | Sommer ................. | B60R 21/08 |
| 11,052,859 | B2 * | 7/2021 | Koo .................... | B60R 21/2338 |
| 11,148,631 | B2 * | 10/2021 | Jaradi .................. | B60R 21/205 |
| 11,186,246 | B2 * | 11/2021 | Min ..................... | B60R 21/232 |
| 11,254,277 | B2 * | 2/2022 | Jeong .................... | B60R 21/013 |
| 2017/0267199 | A1 * | 9/2017 | Schütt .................... | B60R 21/13 |
| 2018/0162207 | A1 * | 6/2018 | Pike ...................... | B60J 7/0015 |
| 2018/0162314 | A1 * | 6/2018 | Lee ..................... | B60R 21/2338 |

(Continued)

FOREIGN PATENT DOCUMENTS

| | | | | |
|---|---|---|---|---|
| CN | 109130807 A | * | 1/2019 | ............ A62B 3/005 |
| DE | 102016104780 A1 | * | 9/2017 | ............ B60R 21/08 |
| JP | 2006273042 A | * | 10/2006 | ........... B60R 21/232 |

*Primary Examiner* — Nicole T Verley
(74) *Attorney, Agent, or Firm* — Gordon Rees Scully Mansukhani, LLP

(57) ABSTRACT

An airbag module for a roof opening of a vehicle having an expandable safety device configured to be deployed after a dynamic vehicle event, such as a vehicle rollover. The airbag module includes a mechanism and an inflator in order to deploy the expandable safety device across the roof opening of the vehicle.

7 Claims, 13 Drawing Sheets

(56) References Cited

U.S. PATENT DOCUMENTS

| | | | |
|---|---|---|---|
| 2019/0016292 A1* | 1/2019 | Son | B60R 21/262 |
| 2019/0143928 A1* | 5/2019 | Raikar | B60J 7/02 |
| | | | 280/730.1 |
| 2019/0299919 A1* | 10/2019 | Raikar | B60R 21/232 |
| 2020/0223387 A1* | 7/2020 | Min | B60R 21/2338 |
| 2021/0138996 A1* | 5/2021 | Min | B60R 21/26 |
| 2021/0237675 A1* | 8/2021 | Min | B60R 21/213 |

* cited by examiner

ROOF AIRBAG MODULE

CROSS REFERENCE TO RELATED APPLICATION

This application claims priority to and the benefit of U.S. Provisional Application No. 62/994,753, filed Mar. 25, 2020. The foregoing provisional application is incorporated by reference herein in its entirety.

GENERAL DESCRIPTION

The present disclosure relates to an airbag module for an opening located on the roof a vehicle. In particular, a roof airbag module located on the roof of the vehicle configured to deploy a cushion extending across the roof opening. The roof opening may be, for example, configured to include a panoramic sunroof. Panoramic roof systems are typically large or multi-panel sun or moon roofs which offer openings above both the front and rear seats and may be movable or fixed glass panels.

A vehicle, such as an automobile, may include a selectively opened/closed opening located on the roof the vehicle. Airbags arrangement are also typically provided for covering the opening during a dynamic event such as a vehicle rollover. Such airbag arrangements are known, for example, in patent U.S. Pat. No. 9,610,915 B2 or 9,771,048 B2. There is a need for improvement of these systems in order to provide improved coverage of a roof opening.

The disclosed embodiments include improved panoramic roof airbag modules and methods of deploying the airbag from such a module.

SUMMARY

According to one disclosed embodiment, an airbag module is provided for a vehicle. The airbag module is configured to overlie, underlie, or cover an opening in a roof of a vehicle. The airbag module includes an expandable safety device attached to the vehicle at one end, and attached to a rod (e.g., a curtain type rod) at the other opposing end. As used throughout this application, an expandable safety device refers to an inflatable airbag, a fabric panel (e.g., a sail panel) or other flexible and/or compressible structure configured to be impacted by a passenger of a vehicle in an emergency situation. The expandable safety device can be configured to absorb energy in the event of the vehicle being involved in an emergency situation. The airbag modules disclosed herein may also include an inflator for rapidly inflating an airbag. The modules may include an actuator that includes a pyrotechnic type actuator to allow for rapid deployment of the expandable safety device to cover an opening in a vehicle roof. According to one embodiment, an actuation assembly is configured to move the rod such that the expandable safety device covers the opening of the roof when deployed. The actuation assembly includes a first cable connected to one end of the rod and a cable anchor and second cable connected to another end of the rod and the cable anchor, a plurality of fixed pulleys and a plurality of movable pulleys. The first and second cables are routed around the plurality of fixed and movable pulleys, and an actuator is configured to pull the movable pulleys away from the fixed pulleys during a predetermined dynamic vehicle event in order to deploy the expandable safety device to cover the opening of the roof.

According to another disclosed embodiment, an airbag module is provided for a vehicle. The airbag module is configured for an opening in a roof of a vehicle. The airbag module includes an expandable safety device attached to the vehicle at one end, a first rod (e.g., a curtain type rod) attached to the expandable safety device at the other opposing end, an actuation assembly configured to move the first rod such that the expandable safety device covers the opening of the roof when deployed. The actuation assembly may include a spool rod. A spool is connected to the spool rod, and a pretensioned coiled spring configured to bias the spool rod to rotate, a cable connected to the spool at one end and the first rod at the other end, a pin configured to hold the spool rod to prevent rotation of the spool rod due to the bias of the coiled spring, a pin puller configured to pull the pin during a predetermined dynamic vehicle event in order to allow the spool rod to rotate and allow the spool to reel in the cable to deploy the expandable safety device to cover the opening of the roof.

According to yet another disclosed embodiment, an airbag module is provided for a vehicle. The airbag module is configured for an opening in a roof of a vehicle. The airbag module includes an expandable safety device attached to the vehicle at one end, a rod (e.g., a curtain type rod) attached to the expandable safety device at the other opposing end, an actuation assembly configured to move the rod such that the expandable safety device covers the opening of the roof when deployed. The actuation assembly includes a retractor, a cable connected to the retractor at one end and the rod at the other end. The retractor is configured to be biased to pull the cable. A pin is configured to hold the retractor to prevent retraction the cable into the retractor, and a pin puller is configured to pull the pin during a predetermined dynamic vehicle event in order to allow the retractor to pull and wind the cable to deploy the expandable safety device to cover the opening of the roof.

According to a further disclosed embodiment, an airbag module is provided for a vehicle. The airbag module is configured for an opening in a roof of a vehicle. The airbag module includes an expandable safety device attached to the vehicle at one end, a rod (e.g., a curtain type rod) attached to the expandable safety device at the other opposing end, an actuation assembly configured to move the rod such that the expandable safety device covers the opening of the roof when deployed. The actuation assembly includes a gearbox having an actuator configured to drive gears of the gearbox, a drive shaft extending from a gear of the gears of the gearbox, a pair of outer arms pivotally connected to the rod via corresponding sliding pins. The sliding pins are configured to transverse along the rod. The actuation of the actuator during a predetermined dynamic vehicle event rotates the drive shaft such that the pair of outer arms rotate and push the rod in a direction away from the gearbox in order to deploy the expandable safety device to cover the opening of the roof.

It is to be understood that the foregoing general description and the following detailed description are exemplary and explanatory only, and are not restrictive of the invention as claimed.

BRIEF DESCRIPTION OF THE DRAWINGS

The features, aspects, and advantages of the disclosed system will become apparent from the following description, and the accompanying exemplary embodiments shown in the drawings, which are briefly described below.

FIG. 13b is a sectional view of the gearbox of the panoramic roof airbag system shown in FIG. 13a.

DETAILED DESCRIPTION

Figure 1:
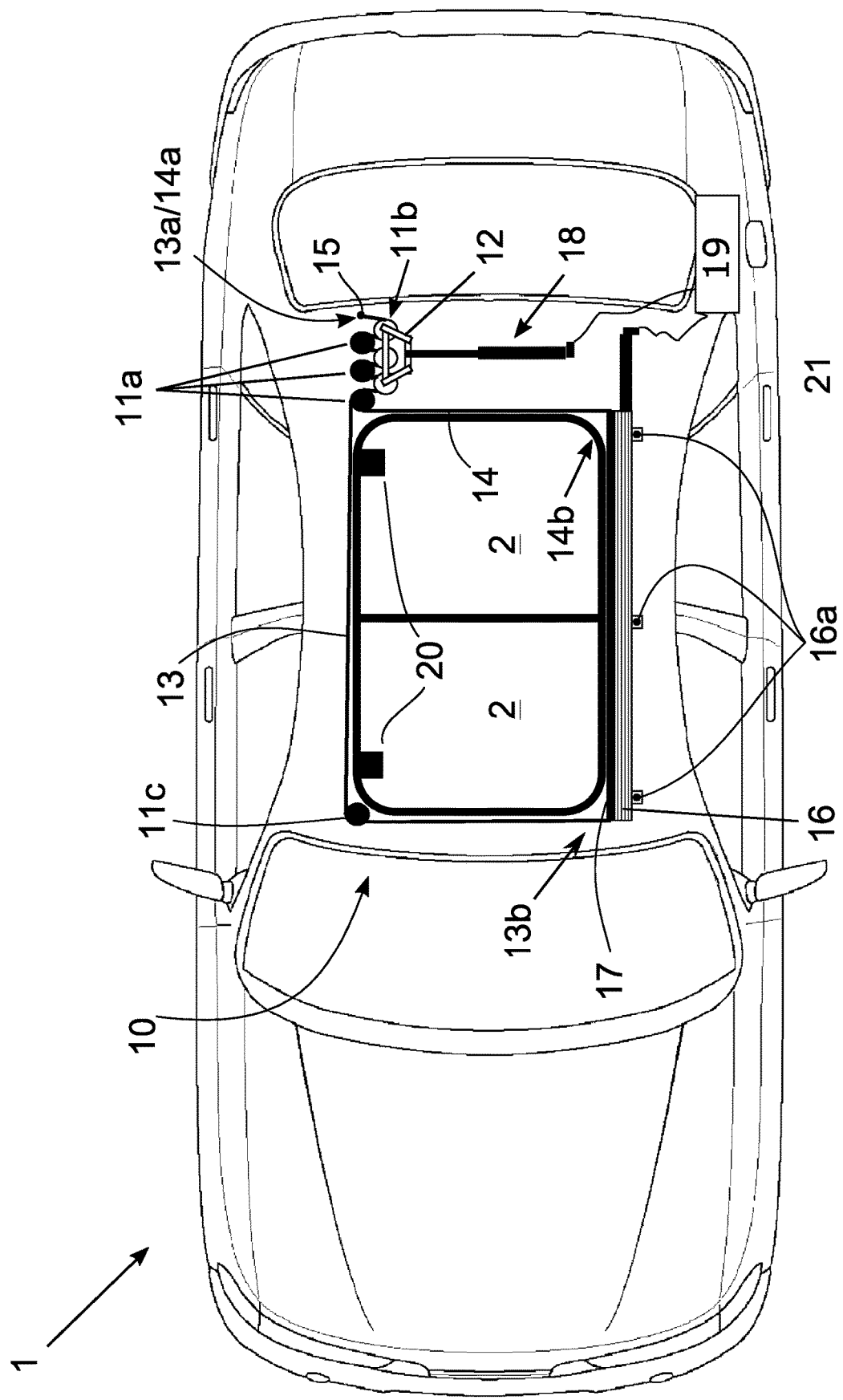
FIG. 1 is a schematic of a panoramic roof airbag system according to a first disclosed embodiment.

FIG. 1 illustrates a vehicle 1 having a panoramic roof opening 2. The vehicle includes a panoramic roof airbag system 10 attached to the roof of the vehicle 1. The airbag system 10 is shown in the stowed position in FIG. 1. The system includes fixed pulleys 11a attached to the vehicle 1 and movable pulleys 11b attached to a movable frame 12. The frame 12 is attached to an actuation device 18. The actuation device 18 may have, for example, a mechanical structure substantially similar to a pretensioner, a hood lifter, or a reverse hood lifter or any other device capable of pulling/pushing. The airbag system 10 further includes a first cable 13 and a second cable 14. One end 13a, 14a of each of the first and second cables 13, 14 may be anchored to a cable anchor 15 that is fixed to the vehicle 1 such as on a vehicle frame. The first and second cables 13, 14 are routed through the pulleys 11a, 11b. An auxiliary pulley 11c may be placed in order to route the cable 13 to the proper location on a rod 17. The rod 17 may be configured for use in the same manner as a curtain type rod. The other end 13b, 14b of the first and second cables 13, 14 is attached to an expandable safety device 16 which may be an inflatable cushion or a flat fabric sail panel. The other ends 13b, 14b of the cables 13, 14 may also be attached to a rod 17 that is configured to be attached to one end of the expandable safety device 16. The other end of the expandable safety device 16 may be anchored to the vehicle such as to the vehicle frame or components such as the headliner or sunroof frame using safety device anchors 16a. The actuation device 18 may be attached to a controller 19 that receives input from one or more sensors configured to sense a dynamic event such as a vehicle rollover.

The various controllers used in the embodiments described herein (e.g., controller 19) may receive information from a number of sensors that can be used to determine the occurrence of a dynamic vehicle event such as a crash or rollover. These sensors may include a speed sensor, a yaw rate sensor, tire sensors, a lateral acceleration sensor, a vertical acceleration sensor, a roll angular rate sensor, a steering wheel angle sensor, a longitudinal acceleration sensor, a pitch rate sensor, steering angle position sensor, suspension load sensor, and a suspension position sensor. Some of these sensors may be grouped together in an inertial measurement unit (IMU) such as lateral acceleration, vertical acceleration, longitudinal acceleration, yaw, pitch and roll rate sensors.

Figure 2:
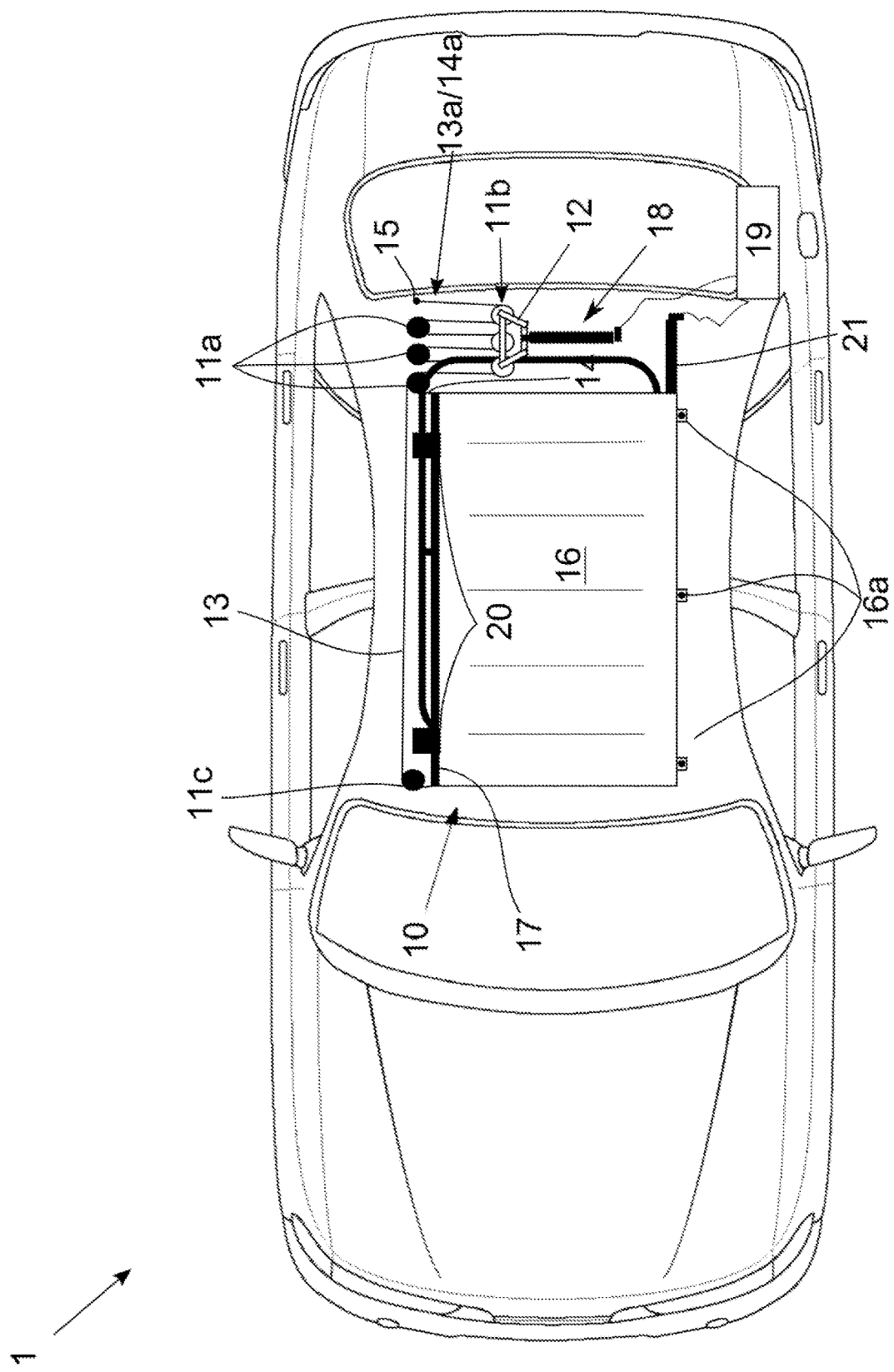
FIG. 2 is a schematic of the panoramic roof airbag system of FIG. 1 shown in a deployed configuration.
Figure 3:
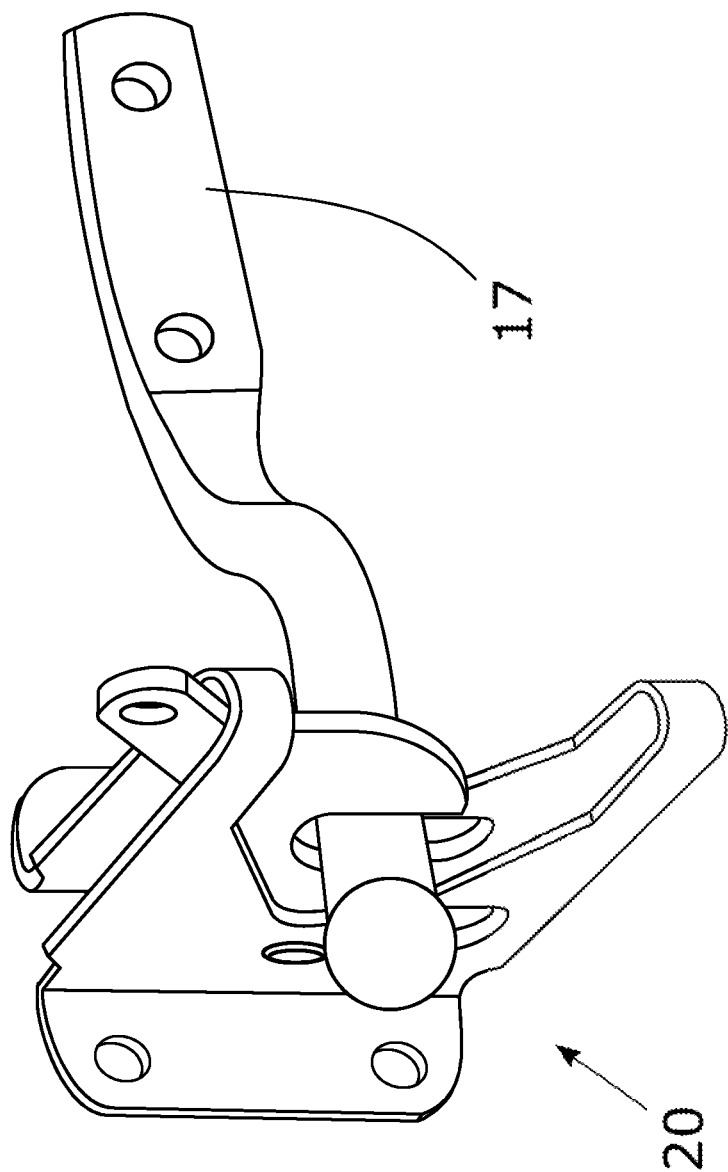
FIG. 3 is an isometric view of a rod catcher for use in the embodiment shown in FIG. 1.

FIG. 2 shows the safety device 16 in a deployed state. During a dynamic event, the controller 19 will send a signal to the actuation device in order to move the frame 12 and movable pulleys 11b away from the fixed pulleys 11a some predetermined distance apart. The movement of the movable pulleys 11b away from the fixed pulleys 11a cause the cables 13, 14 to pull one end of the expandable safety device 16 away from the anchored or fixed end of the safety device 16. This movement extends the extendable safety device 16 to an unfolded position or flat position configured to cover the opening 2 of the panoramic roof as seen in FIG. 2. Rod catchers 20 may be placed opposite of the expandable safety device 16 across the panoramic roof opening 2, as shown in FIG. 1. Rod catchers 20 are configured to receive and hold the rod 17 in place when the airbag system 10 is fully actuated in order to prevent retraction and movement of the safety device 16. FIG. 3 shows a close up of an exemplary rod catcher 20. An inflator 21 may be utilized to inflate the safety device 16 and may be deployed simultaneously with the actuation device 18 or may be deployed at some preset delay after initiation of the actuation device 18. The controller 19 may initiate the inflator 21.

Figure 4:
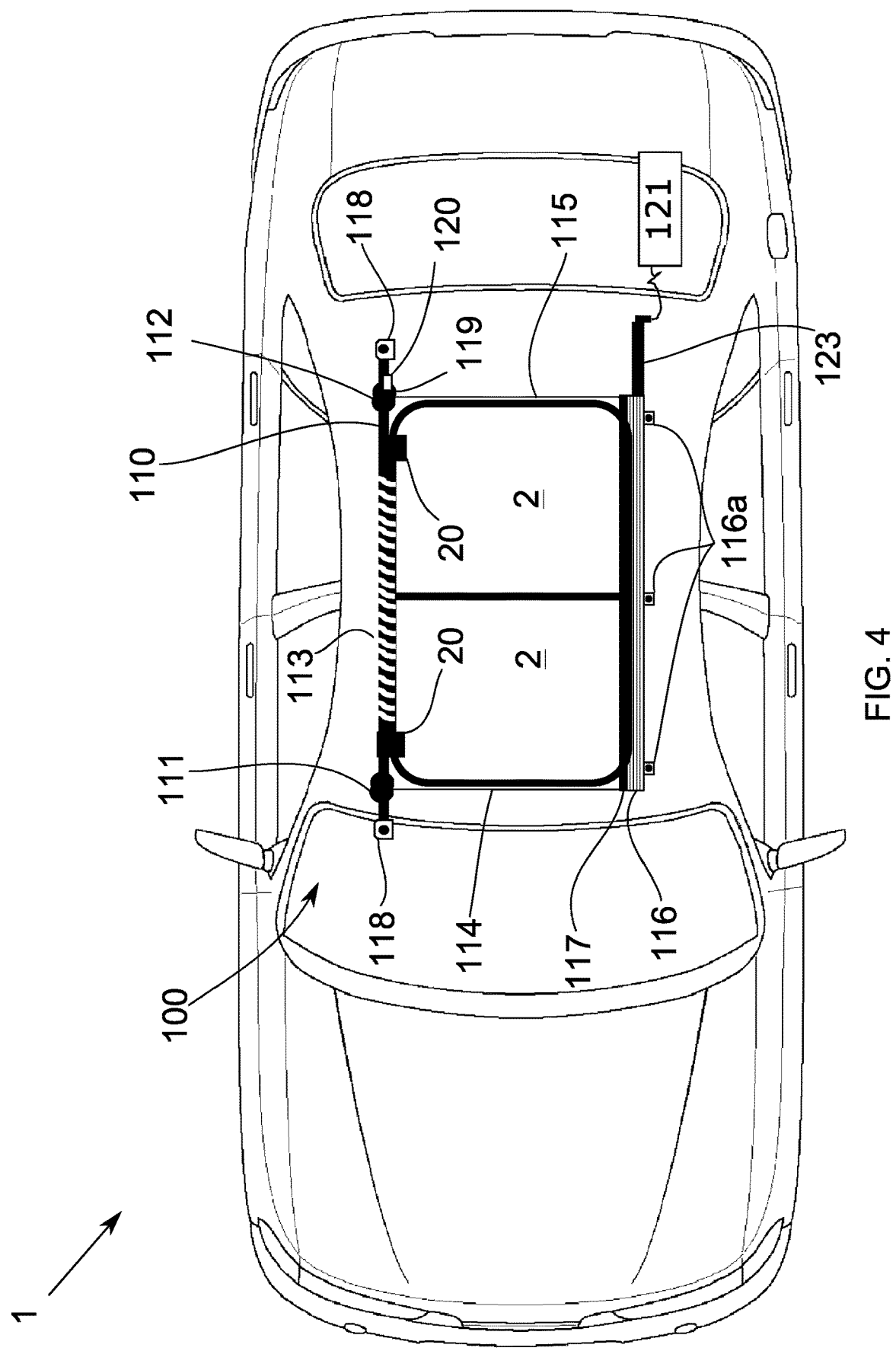
FIG. 4 is a schematic of a panoramic roof airbag system according to a second embodiment.
Figure 6:
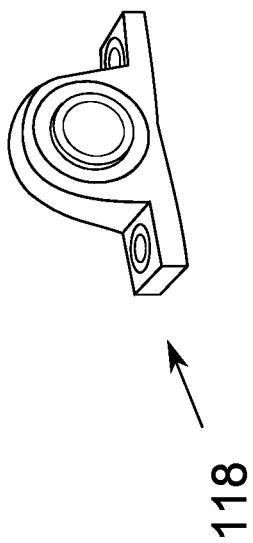
FIG. 6 is an isometric view of a bearing mount used in the embodiment of FIG. 4.

FIG. 4 shows a second embodiment of a panoramic roof airbag system 100 located adjacent to the vehicle panoramic roof opening 2 of the vehicle 1. In this second embodiment, the actuation mechanism of the airbag system 100 includes a spool rod 110 having cable spools 111, 112 located at the ends of the spool rod 110, and a coil spring 113 mechanically connected to the spool rod 110 such that the winding and unwinding of the coil spring 113 is coupled to the rotation of the spool rod 110 about the long axis of the spool rod 110. First and second cables 114, 115 are configured to be attached to corresponding spools 111, 112 at a first end and a rod 117 at a second end. The rod 117 is configured for use in the same manner as a curtain type rod and may be attached to an expandable safety device 116 on one end of the expandable safety device 116. The other end of the expandable safety device 116 may be anchored to the vehicle such as to the vehicle frame or components such as the headliner or sunroof frame via safety device anchors 116a. The ends of spool rod 110 may be attached to rod bearing mounts 118 configured to allow the spool rod 110 to rotate on its longitudinal axis via the unwinding energy received from the coil spring 113. The rod bearing mount 118 is configured to be mounted onto a fixed portion of the vehicle 1, such as on the vehicle frame or components such as the headliner or sunroof frame. A detailed view of the rod bearing mounts 118 is shown in FIG. 6. The spring 113 is configured to be pretensioned in the stowed position as shown in FIG. 4. The spool rod 110 is rotationally locked by a pin 119 (inside spool rod 110) thus preventing the pretensioned coil spring 113 from unwinding. A pin puller 120 is attached to pin 119. The pin puller 120 is configured to receive signals from a controller 121 that receives input from one or more sensors that detect the occurrence of a dynamic event such as a vehicle rollover. During such a dynamic event, the controller 121 sends a deployment signal to the pin puller 120 to pull pin 119.

Figure 5:
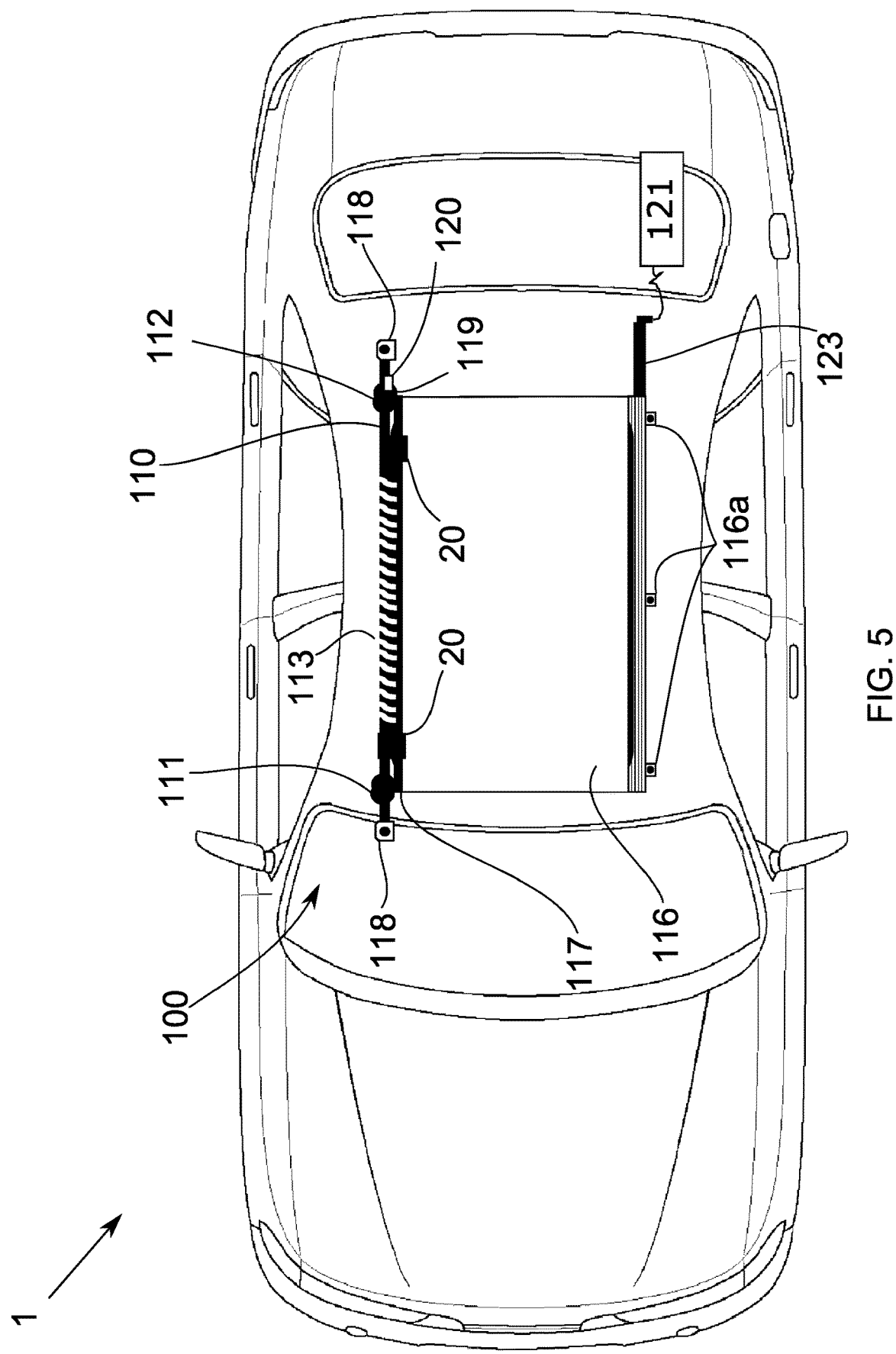
FIG. 5 is a schematic of the panoramic roof airbag system of FIG. 4 shown in a deployed status.

As shown FIG. 5, the removal of pin 119 from the spool rod 110 allows the coil spring 113 to unwind and rotate the spool rod 110 and the cable spools 111, 112 in order to retract the cables 114, 115. In the retracted state cables 114, 115 will be wound around the corresponding cable spools 111 and 112. The retraction of the cables 114, 115 pulls the rod 117 and the expandable safety device 116 across the panoramic roof opening 2 toward the spool rod 110. In the deployed state as shown in FIG. 5, the spring coil 113 has less potential energy than the stowed state as shown in FIG. 4 due to the unwinding of the spring. Rod catchers 20 may be located on the same side of the opening 2 as the spool rod 110. The rod catchers 20 are configured to receive and hold the rod 117 to prevent retraction and improper positioning of the expandable safety device 116 during the dynamic event. A detailed view of the exemplary rod catcher 20 is shown in FIG. 3. An inflator 123 may also be configured to be connected to the controller 121 in order to inflate the expandable safety device 116 in tandem with the actuation of pin puller 120 or at some preset delay after the actuation of the pin puller 120.

Figure 7:
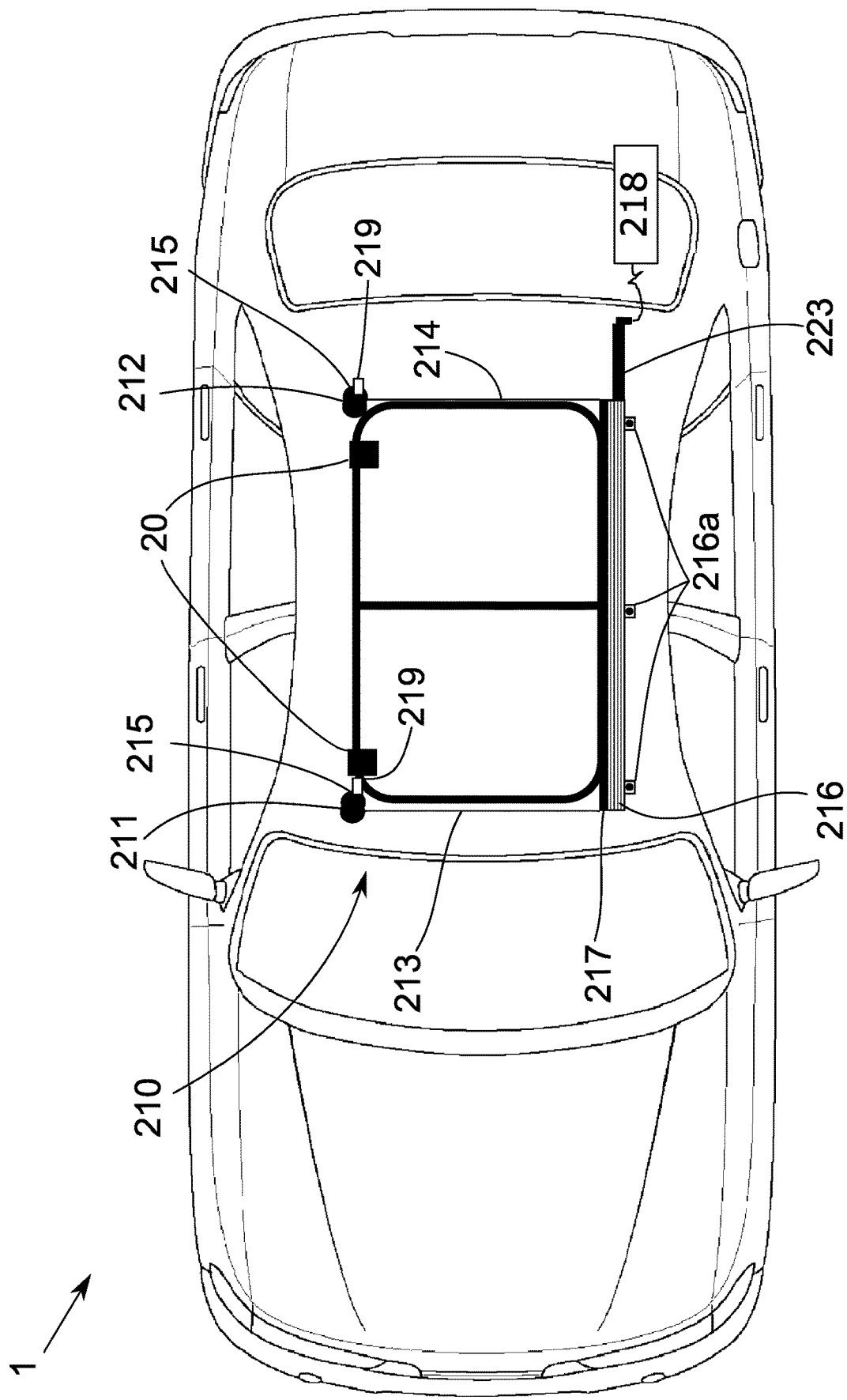
FIG. 7 is a schematic of a panoramic roof airbag system according to a third embodiment.

FIG. 7 shows a third embodiment of a panoramic roof airbag system 210. The system shown in FIG. 7 utilizes two retractors 211, 212 in order to pull the expandable safety device 216 across panoramic roof opening 2. The retractors 211, 212 may be similar to a seatbelt retractor in the field of seatbelt systems. For example, the seat belt retractors disclosed in U.S. Pat. Nos. 6,908,112 and 7,246,822 (or similar products) may be modified for use in such a system. The foregoing patents are incorporated by reference herein.

Figure 8:
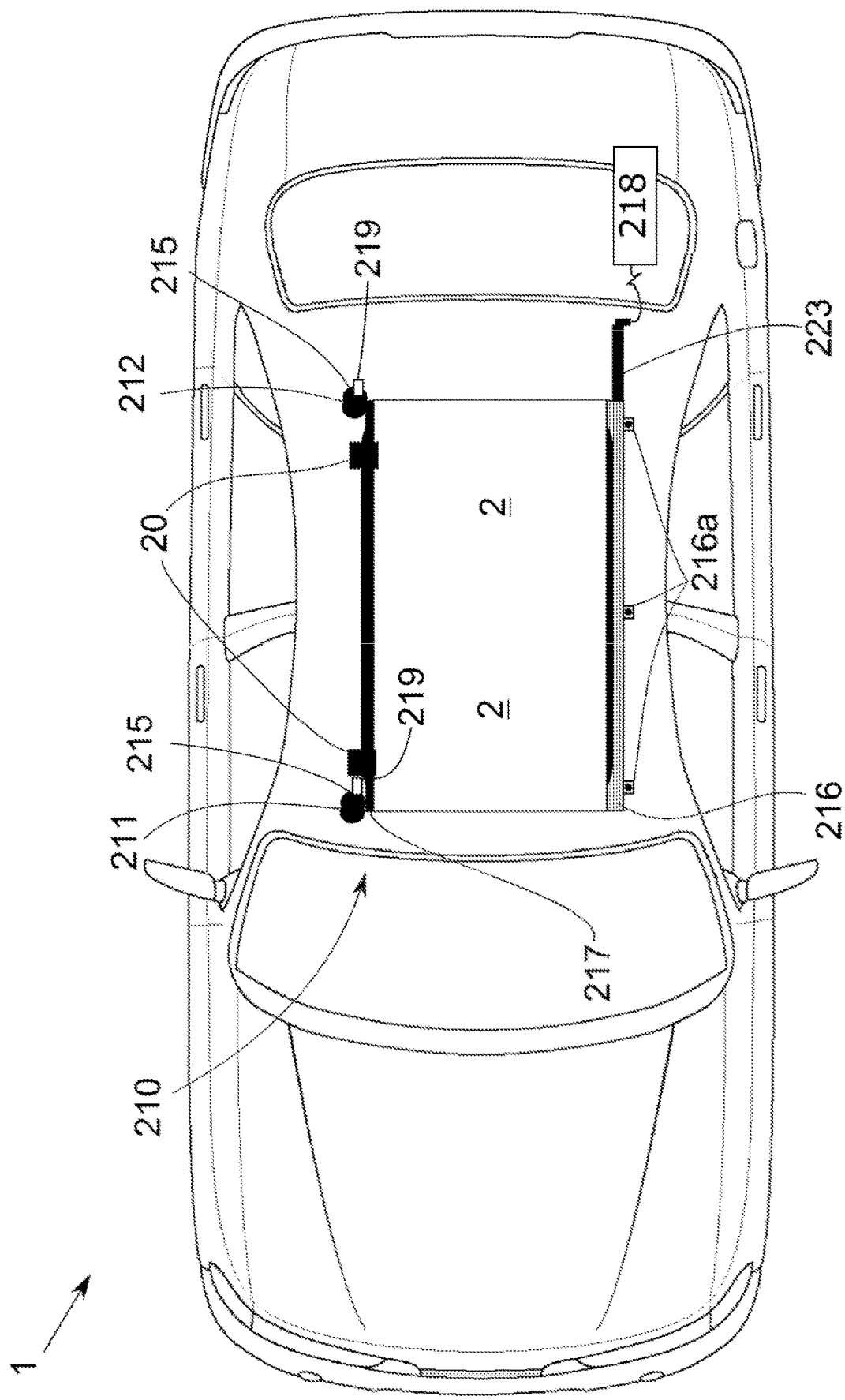
FIG. 8 is a schematic of the panoramic roof airbag system of FIG. 7 shown in a deployed status.

As shown in FIG. 7, the cables 213 and 214 are attached to corresponding retractors 211, 212 at one end and the rod 217 at the other end. The rod 217 may be configured as a curtain type rod. The rod 217 is attached to one end of the expandable safety device 216. The other end of the expandable safety device 216 may be anchored to the vehicle such as to the vehicle frame or components such as the headliner or sunroof frame via safety device anchors 216a. The retractors 211, 212 are biased towards a retraction direction such that the cables 213, 214 are constantly being pulled or under tension. Pins 215 are attached to corresponding retractors 211, 212, and each pin 215 is configured to hold and lock the respective retractors from retracting to prevent the pulling and deployment of the expandable safety device 216. As shown in FIG. 8, upon a detection of a dynamic event, a controller 218 will send a signal to corresponding pin pullers 219 to pull the pins 215 to allow the retractors 211 and 212 to retract to pull cables 213 and 214 and deploy the expandable safety device 216. The cables 213 and 214 may be wires or webbings. The rod catchers 20 may be located on the same side of the opening 2 as the retractors 211 and 212. The rod catchers 20 are configured to receive and hold the rod 217 to prevent retraction and improper positioning of the expandable safety device 216 during the dynamic event. A detailed view of the rod catcher 20 is shown in FIG. 3. An inflator 223 may also be configured to be connected to the controller 218 in order to inflate the expandable safety device 216 in tandem with the actuation of pin pullers 219 or at some preset delay after the actuation of the pin pullers 219.

FIGS. 9-13b shows a fourth embodiment of a panoramic roof airbag system 310. This embodiment utilizes a wiper type mechanism utilizing side tracks 311 (omitted in FIG. 9 and FIG. 10). The side tracks 311 provide a path along which a rod 317 travels. The rod 317 may be configured as a curtain type rod and may be mounted onto side tracks 311 via wheels or bearings. One end of an expandable safety device 316 is attached to the rod 317, while the other end of the expandable safety device is attached to safety device anchors 316a. A pair of outer arms 312 and 313 are pivotably attached to the rod 317 via sliding pins 312a and 313a. Sliding pins 312a and 313a are configured to slide across two separate tracks within the rod 317. For example, sliding pin 312a is located on the one side of the rod 317 while sliding pin 313a is located on the other side of the same rod 317. The outer arms 312 and 313 are located on different heights such that the arms 312 and 313 are allowed to pass each other during actuation of the airbag system 310. For example, the first outer arm 312 may be fastened above first wiper arm 314 while the second outer arm 313 may be fastened below the second wiper arm 315. The outer arms 312, 313 are connected to a first set of wiper arms 314, 315. The first set of wiper arms 314, 315 are pivotably connected to a second set of wiper arms 320, 321. The second set of wiper arms 320, 321 are connected to opposing ends of a main arm 322. The main arm 322 is connected to a gearbox 323 via a driveshaft 324. The drive shaft 324 is connected to the main arm 322 on its center. The gearbox 323 is mechanically connected to actuator 325 which rotates gears 324a of the gearbox to rotate the driveshaft 324 and main arm 322. The actuator 325 includes an actuator rod 325a configured to engage and rotate gears 324a. The actuator 325 includes a motor, or a pyrotechnic device configured to be structurally similar to a hood lifter, buckle pretensioner or a retractor pretensioner that fires a rack to cause movement of the wiper arms.

Figure 9:
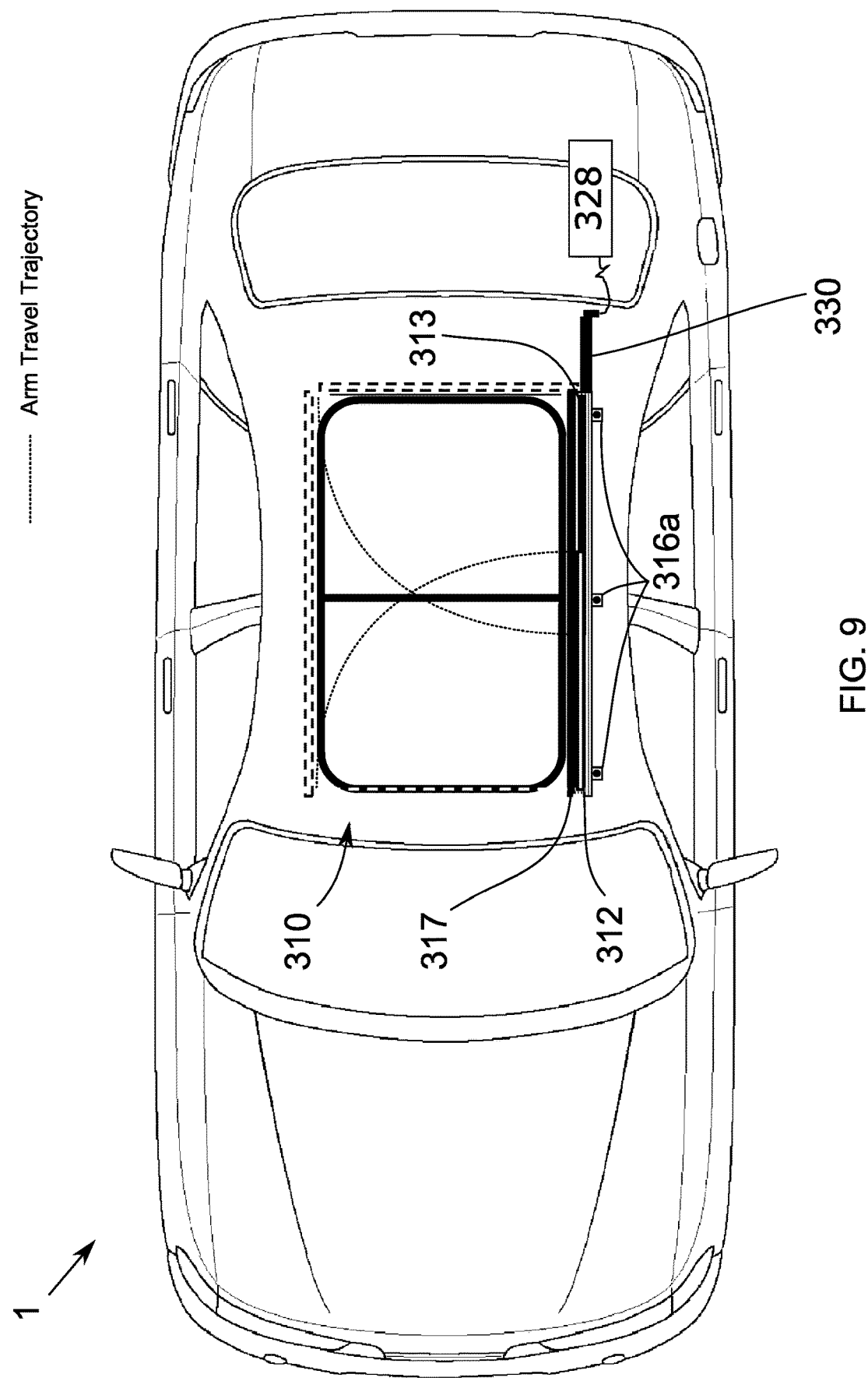
FIG. 9 is a schematic of a panoramic roof airbag system according to a fourth embodiment.
Figure 10:
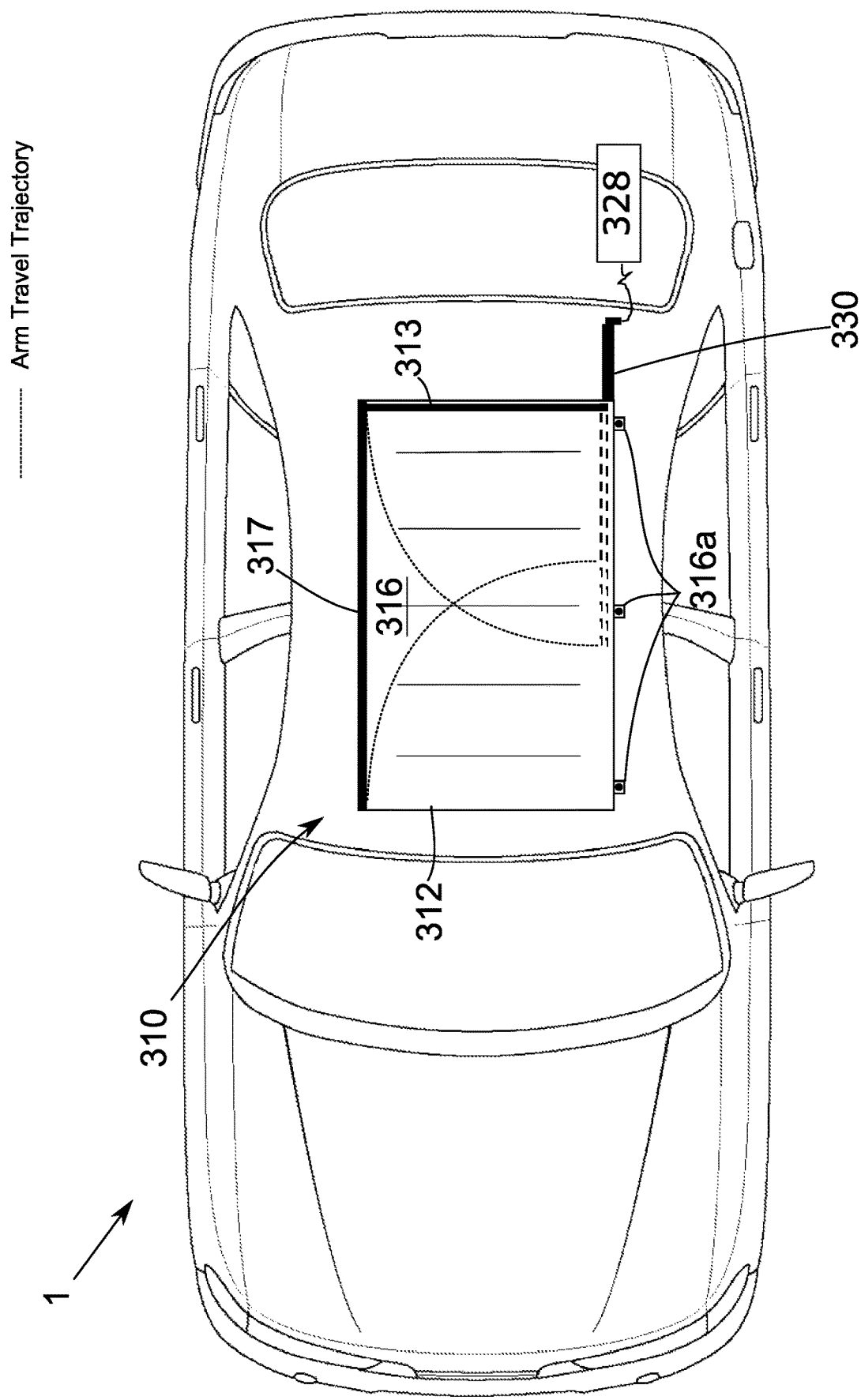
FIG. 10 is a schematic of the panoramic roof airbag system of FIG. 9 shown in a deployed status.
Figure 11:
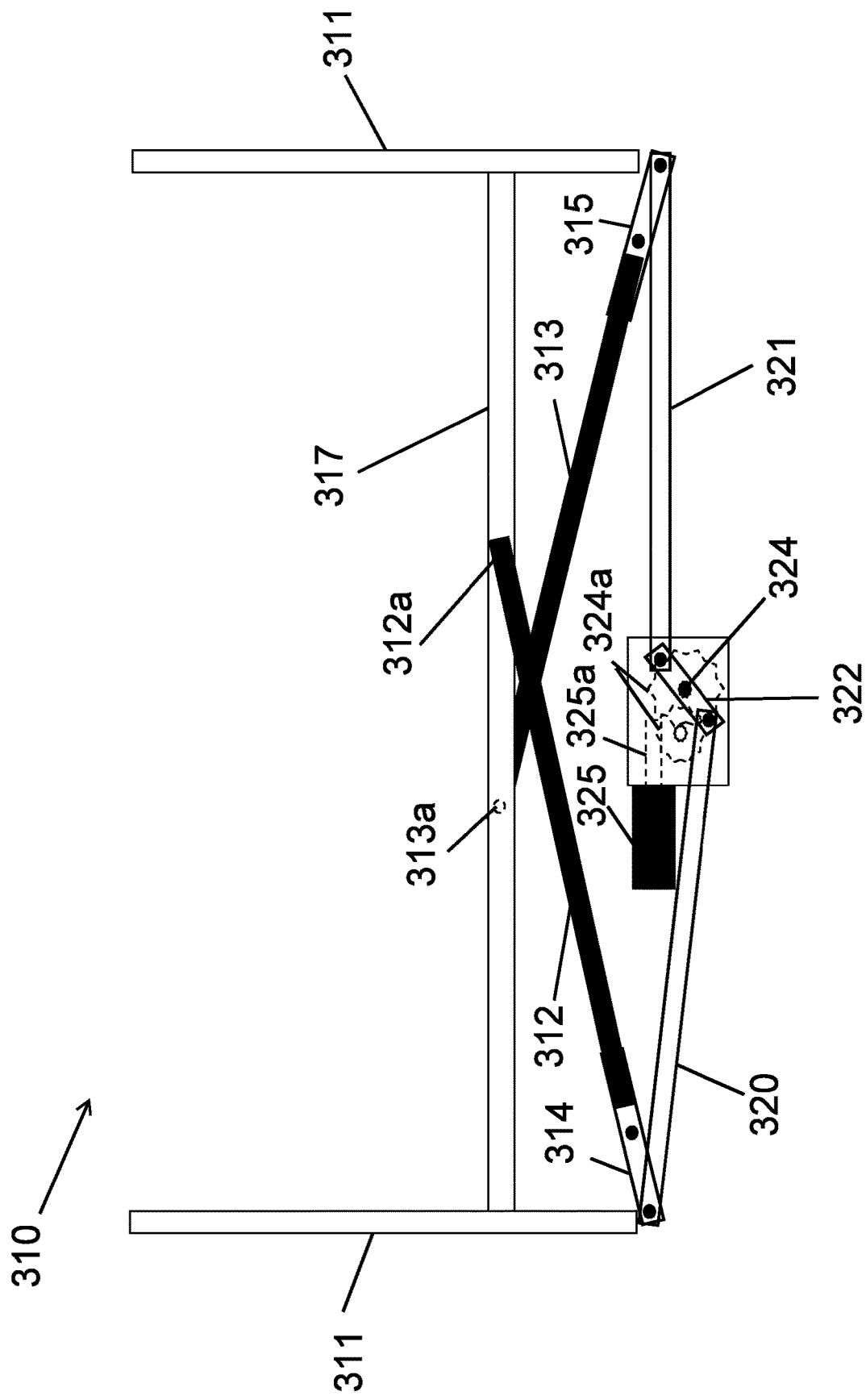
FIG. 11 is another schematic of panoramic roof airbag system of FIG. 9 shown in a stowed configuration.
Figure 12:
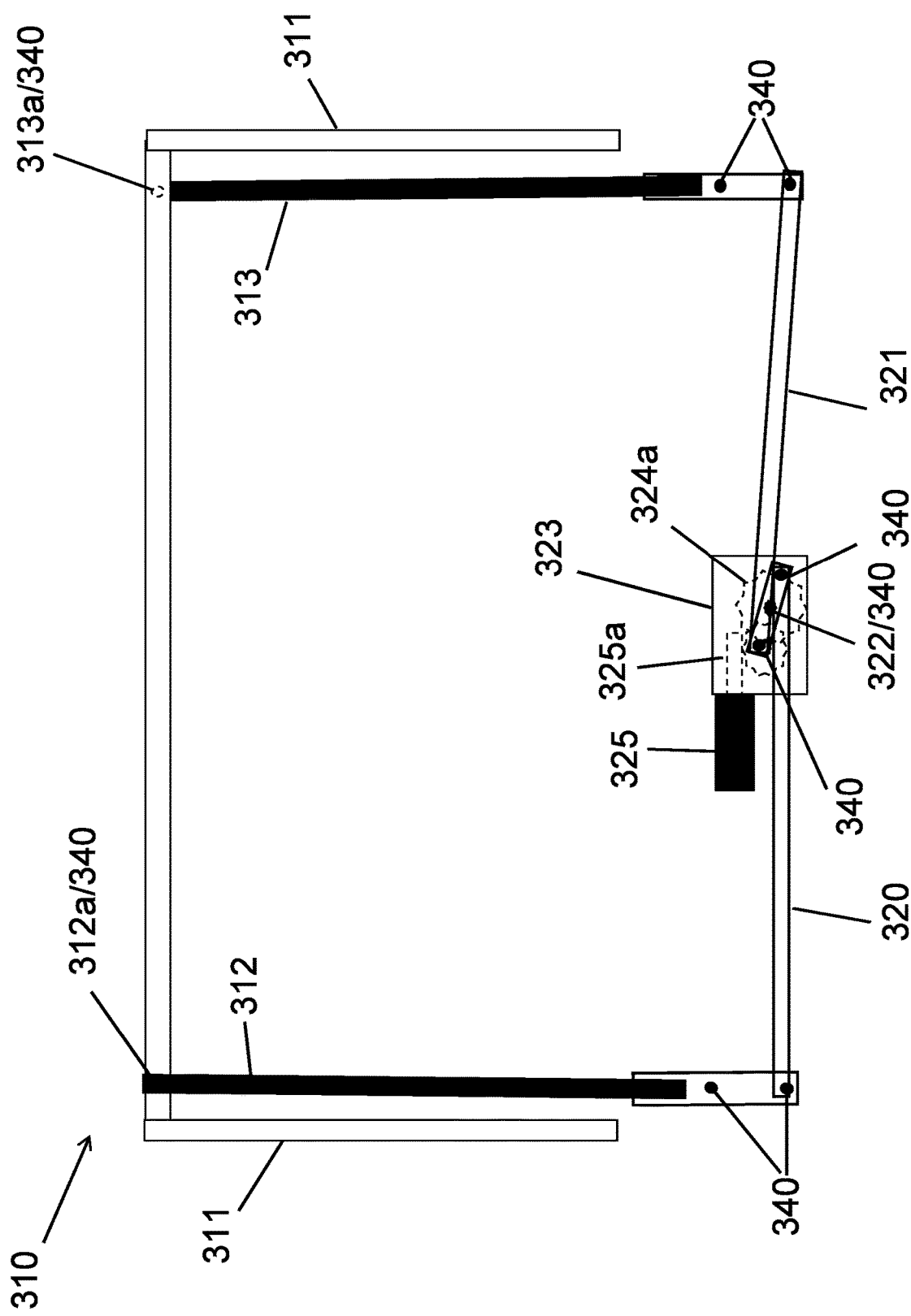
FIG. 12 is another schematic of the panoramic roof airbag system in FIG. 9 in the deployed position.
Figure 13A:
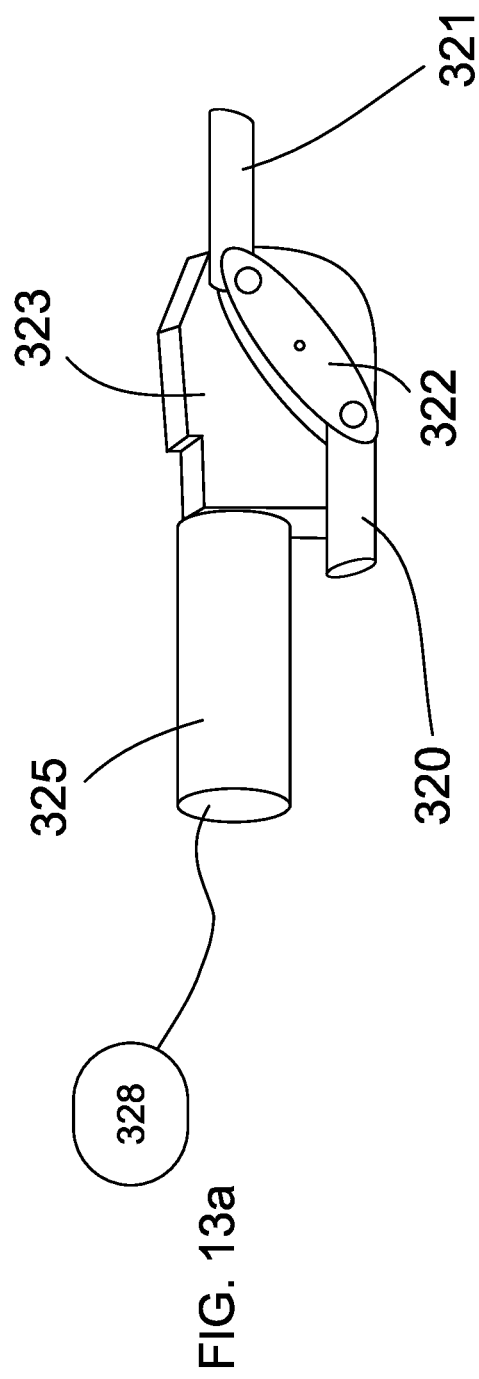
FIG. 13a is a close up view of a gearbox area for an embodiment of a panoramic roof airbag system disclosed herein.
Figure 13B:
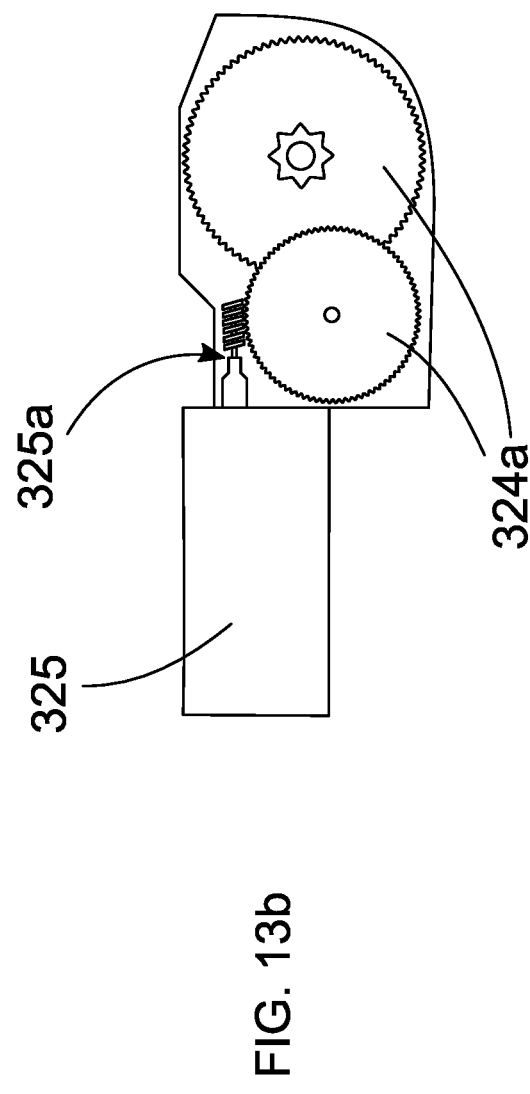

In the undeployed states shown in FIGS. 9 and 11 the outer arms 312, 313 along with first wiper arms 314, 315 are folded together with the second wiper arms 320, 321. Upon detection of a dynamic event via a sensor providing input to a controller 328, a signal from the controller 328 will be sent to the actuator 325 in order to drive the gears 324a of the gearbox 323 in order to rotate main arm 322. The rotation of the main arm will move first and second wiper arms 314, 315, 320, 321 to rotate the outer arms 312, 313 and slide pins 312a, 313a outwards. The movement of the outer arms 312, 313 and the sliding of the pins 312a, 313a results in the pushing of the rod 317 away from the gearbox 323 and across the panoramic roof opening 2 to a deployed state as shown in FIGS. 10 and 12. The outer arms 312, 313 may rotate approximately 90 degrees from the stowed position to deployment. Components of the panoramic roof airbag system 310 may pivot along pivot points 340. An inflator 330 may also be configured to be connected to the controller 328 in order to inflate the expandable safety device 316 in tandem with the actuation of actuator 325 or at some preset delay after the activation of actuator 325.

In the embodiments described herein, the expandable safety device may be an inflatable airbag or a noninflatable fabric panel (e.g., a sail panel).

In sum, an improved deployment method and system is provided for the deployment of the panoramic airbag.

As utilized herein, the terms "approximately," "about," "substantially", and similar terms are intended to have a broad meaning in harmony with the common and accepted usage by those of ordinary skill in the art of automotive safety devices. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the panoramic roof airbag system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An airbag module for an opening in a roof of a vehicle, the airbag module comprising:
    an expandable safety device attached to the vehicle at one end;
    a rod attached to the expandable safety device at the other opposing end;
    an actuation assembly configured to move the rod such that the expandable safety device covers the opening of the roof when deployed; and
    wherein the actuation assembly comprises:
        a retractor;
        a cable connected to the retractor at one end and the rod at the other end, wherein the retractor is configured to be biased to pull the cable;
        a pin configured to hold the retractor to prevent retraction of the cable into the retractor; and
        a pin puller configured to pull the pin during a predetermined dynamic vehicle event in order to allow the retractor to pull and wind the cable to deploy the expandable safety device to cover the opening of the roof.

2. The airbag module of claim 1, further comprising a rod catcher located across the opening of the roof relative to the rod.

3. The airbag module of claim 1, further comprising an inflator configured to inflate the expandable safety device.

4. The airbag module of claim 3, further comprising a controller configured to send an actuation signal to the inflator and the pin puller after sensing an occurrence of the dynamic vehicle event.

5. The airbag module of claim 1, wherein the attached end of the expandable safety device is fixed to a vehicle frame, a headliner, or a sunroof frame.

6. The airbag module of claim 1, wherein the retractor is located across the opening of the roof relative to the rod.

7. The airbag module of claim 6, further comprising a second retractor, a second cable, and a second pin puller.

* * * * *